United States Patent [19]

Go et al.

[11] 4,384,106

[45] May 17, 1983

[54] COPOLYESTERS

[75] Inventors: Santos W. Go; Dennis J. Burzynski, both of Toledo, Ohio

[73] Assignee: Owens-Illinois, Inc., Toledo, Ohio

[21] Appl. No.: 356,556

[22] Filed: Mar. 9, 1982

[51] Int. Cl.³ .................... C08G 63/66; C08G 63/68
[52] U.S. Cl. .................... 528/173; 528/176; 528/193; 528/194; 528/195
[58] Field of Search ............. 528/173, 176, 193, 194, 528/195

[56] References Cited

U.S. PATENT DOCUMENTS

| | | | |
|---|---|---|---|
| 2,973,339 | 2/1961 | Muenster et al. | 528/195 |
| 3,558,557 | 1/1971 | Hrach et al. | 528/195 |
| 4,145,517 | 3/1979 | Go | 528/173 |
| 4,188,357 | 2/1980 | Go | 528/173 |
| 4,196,275 | 4/1980 | Go | 528/173 |
| 4,307,060 | 12/1981 | Go | 528/173 |
| 4,330,661 | 5/1982 | Go | 528/173 |

*Primary Examiner*—Lester L. Lee
*Attorney, Agent, or Firm*—Charles S. Lynch; Myron E. Click; David H. Wilson

[57] ABSTRACT

Disclosed are copolyesters based on terephthalic or isophthalic acids, or both and at least one of 1,3 bis(2-hydroxyethoxy)benzene and bis(4-β-hydroxyethoxyphenyl) sulfone, which also contain 1,4 bis(2-hydroxyethoxy)benzene as one of the diol reactants in order to prepare solid copolyesters having improved folding endurance or fatigue resistance than the same copolyesters without such coreactant.

4 Claims, No Drawings

COPOLYESTERS

This invention relates to copolyesters based on terephthalic or isophthalic acids, or both, which contain 1,4 bis(2-hydroxyethoxy)benzene as one of the diol reactants in order to prepare solid copolyesters having improved folding endurance or fatigue resistance than the same polyesters without such coreactant.

Polyesters based on terephthalic acid and ethylene glycol are well known for making containers and packaging materials such as film and sheet. The polymer is highly crystallizable, which is highly desirable for many applications; it has a generally suitable glass transition temperature, Tg, and a generally suitable resistance to the permeation of oxygen and carbon dioxide gases. It is also desirably ductile and flexible.

However, in a number of applications it is desirable to have a copolyester that has a higher resistance to permeation of $CO_2$ and $O_2$, or a higher Tg, or both. In such event 1,3 bis(2-hydroxyethoxy)benzene can be used as part of the diol in making the polyester to lower the gas permeability, and bis(4-β-hydroxyethoxyphenyl)sulfone can be used as part of the diol to raise Tg. Moreover, it is possible to replace part or all of the terephthalic reactant with isophthalic acid (or esters) to lower gas permeability. Or all of these substitutions can be made in the same copolyester.

In any event, each of the substitution of 1,3 bis(2-hydroxyethoxy)benzene or bis(4-β-hydroxyethoxyphenyl)sulfone, or both has the effect of making the polyester more brittle and thus not have as good fatigue resistance or folding endurance.

It is an object of the present invention to provide new copolyesters having increased folding endurance while not adversely affecting such properties as Tg and gas permeabilities to any significant degree.

A further object is to provide hollow containers and film and sheet for packaging made from such copolyesters.

Other objects, as well as aspects and advantages, will become apparent from a study of the accompanying description and examples.

The present invention is in the discovery that such copolyesters that contain 1,3 bis(2-hydroxyethoxy)benzene or bis(4-β-hydroxyethoxyphenyl)sulfone, or both, and are significantly more brittle than PET can have their folding endurance (or fatigue resistance) improve by including 1,4 bis(2-hydroxyethoxy)benzene as part of the diol in preparing the polyester.

Thus, according to the present invention there is provided a solid thermoplastic copolyester consisting essentially of:

(A) reactant(s) selected from isophthalic acid, terephthalic acid, and their $C_1$ to $C_4$ alkyl esters, and any mixture thereof in any proportion, (B) reactants, ethylene glycol plus 1,4 bis(2-hydroxyethoxy)benzene and one or both of 1,3 bis(2-hydroxyethoxy)benzene and bis(4-β-hydroxyethoxyphenyl)sulfone and optionally, other dihydroxylated hydrocarbons or oxyhydrocarbons, wherein the B reactants are 110 to 300 mol percent of said A reactants, all B reactants combined, exclusive of ethylene glycol, do not exceed 90 mol percent of said A reactants, bis(4-β-hydroxyethoxyphenyl)sulfone is 0 to 80 mol percent of said A reactants, 1,3 bis(2-hydroxyethoxy)benzene is 0 to 83 mol percent of said A reactants, said other dihydroxylated oxyhydrocarbons or hydrocarbons are 0–20 mol percent of said A reactants, usually 0–15 mol percent, the mols of 1,3 bis(2-hydroxyethoxy)benzene plus twice the mols of bis(4-β-hydroxyethoxyphenyl)sulfone are at least 10 mol percent of said A reactants, and 1,4 bis(2-hydroxyethoxy)benzene is 7–70 mol percent of said A reactants, usually at least 10 mol percent.

It is important to note that the hydroquinone derivative which is used to increase the folding endurance does not significantly affect the gas permeabilities or the Tg of the copolyesters of the invention.

When it is stated herein that the reactants "consist essentially of" certain reactants, this means that the reactants positively recited are essential, but that the usual other ingredients can be included, such as colorants, inert fillers, polymerization catalysts, cross-linking agents to improve melt strength (see U.S. Pat. Nos. 4,188,357, issued Feb. 12, 1980, and 4,307,060 issued Dec. 22, 1981, wherein from 0.1 to 0.7 mol percent of trimellitic acid anhydride, trimesic acid, or a triol, $RC(CH_2OH)_3$, where R is methyl or ethyl, is included to increase melt strength). Such other ingredients can be included if they do not deleteriously affect the basic and novel characteristics of the products of my invention or of the process of the present invention, as they are described herein.

The copolyesters of the invention are solid copolyesters having an inherent viscosity of at least 0.4 dl/g., usually at least 0.5 and for most commercial applications, at least 0.7 dl/g. The inherent viscosities referred to herein are those measured at 25° C., using a solution of 0.25 gms. of polymer dissolved in 100 milliliters of a mixture of 3 weight parts phenol with 2 weight parts 1,1,2,2 tetrachloroethane.

The glass transition temperature, Tg, was determined using a Perkin-Elmer Differential Scanning Calorimeter, Model DSC-2, in manner similar to that described in U.S. Pat. No. 3,822,322, issued July 2, 1974, using a heating rate of 10° C./minute.

In U.S. Pat. No. 2,973,339 is disclosed copolyesters of terephthalic acid, ethylene glycol and para-di-(β-hydroxyethoxy)benzene or para para 1-dihydroxydiphenyldimethylmethane or para para 1-dihydroxydiphenyl sulfone, but PET is not brittle; moreover, the additive is added mainly to improve certain properties for filiers, e.g., dyeability.

In U.S. Pat. No. 3,558,557 it is disclosed that copolyesters can be made which are the reaction products of (1) five named aromatic dicarboxylic acids including isophthalic and terephthalic, (2) one of a very large number of oxalkylation products of compounds having two phenolic hydroxyl groups, including a general formula that could include 1,4 bis(2-hydroxyethoxy)benzene, (3) aliphatic or alicyclic dioles, and (d) small amounts of certain polyfunctional compounds such as phyromellitic acid. No working example uses the 1,4 bis(2-hydroxyethoxy)benzene of our invention, nor does any example deal with adding a monomer to a polymer reaction mixture that is inherently brittle or has poor folding endurance. In fact, all working examples use DMT, ethylene glycol and either bis-phenol-A-diglycolether or 1,4-bis-(hydroxymethyl)cyclohexane, plus a small amount of a poilyfunctional compound.

In short, neither reference recognizes the problem of improving the folding endurance of copolyesters that contain either 1,3 bis(2-hydroxyethoxy)benzene or bis(4-β-hydroxyethoxyphenyl)sulfone, or both. Nor does either reference suggest the present compositions for any purpose.

The following examples are illustrative of the invention.

EXAMPLE 1

Into a 1-liter stainless steel reactor equipped with a stirrer, nitrogen gas inlet port and a condenser, the following were added:
- 139.5 g. isophthalic acid
- 59.8 g. terephthalic acid
- 60.9 g. bis(4-β-hydroxyethoxyphenol)sulfone
- 78.2 g. ethylene glycol
- 23.8 g. 1,4 bis(2-hydroxyethoxy)benzene
- 0.0874 g. Sb$_2$O$_3$
- 0.0660 g. Titanyl acetylacetonate
- 0.0303 g. manganese hypophosphite monohydrate
- 0.4325 g. 1,1,1 tris(hydroxymethyl)ethane The reaction mixture was heated at 240° C. for 2 hours under 35 psi nitrogen atmosphere, and then the pressure was lowered to atmospheric. Water was continuously distilled out during this period. Then 0.4128 g. of tris(nonylphenyl)phosphite was added to the mixture in the reactor. The reaction temperature was increased to 250° C. and maintained for 25 min. under nitrogen atmosphere. Thus the nitrogen gas flow was stopped and a vacuum of less than 0.4 mm Hg was applied. The reaction was continued at 270° C. under less than 0.4 mm Hg for 3 hours 55 minutes. The copolyester had an inherent viscosity of 0.85. Tg was 78° C. A pressed film of about 10 mil thick required 7 cyclic foldings before losing its tear strength completely.

EXAMPLE 2

Into a 1-liter stainless steel reactor equipped with s stirrer, nitrogen gas inlet port and a condenser, the following were added:
- 139.5 g. isophthalic acid
- 59.8 g. terephthalic acid
- 60.9 g. bis(4-β-hydroxyethoxyphenyl)sulfone
- 100.6 g. ethylene glycol
- 59.4 g. 1,4 bis(2-hydroxyethoxy)benzene
- 0.4325 g. 1,1,1 tris(hydroxymethyl)ethane
- 0.0874 g. Sb$_2$O$_3$
- 0.0660 g. titanylacetyl acetonate
- 0.0303 g. manganese hypophosphite monohydrate The reaction mixture was heated at 240° C. for 1 hour 5 minutes under 30 psi nitrogen atmosphere, and then the pressure was lowered to atmospheric. Water was continuously distilled out during this period. Then 0.4128 g. of tris(nonylphenyl)phosphite was added to the mixture in the reactor. The reaction temperature was increased to 250° C. and maintained for 30 minutes under nitrogen atmosphere. Thus the nitrogen gas flow was stopped and a vacuum of less than 0.4 mm Hg was applied. The reaction was continued at 270° C. under less than 0.4 mm Hg for 4 hours. The copolyester had an inherent viscosity of 0.70. A pressed film of about 10 mil thick required 6 cyclic foldings before losing its tear strength completely.

EXAMPLE 3

Into a 1-liter stainless steel reactor equipped with a stirrer, nitrogen gas inlet port and a condenser, the following were added:
- 139.5 g. isophthalic acid
- 59.8 g. terephthalic acid
- 60.9 g. bis(4-β-hydroxyethoxyphenyl)sulfone
- 81.9 g. ethylene glycol
- 11.9 g. 1,4 bis(2-hydroxyethoxy)benzene
- 0.4325 g. 1,1,1 tris(hydroxymethyl)ethane
- 0.0660 g. titanyl acetylacetonate
- 0.0303 g. manganese hypophosphite monohydrate The reaction mixture was heated at 240° C. for 2 hours under 35 psi nitrogen atmosphere, and then the pressure was lowered to atmospheric. Water was continuously distilled out during this period. Then 0.4128 g. of tris(monylphenyl)phosphite was added to the mixture in the reactor. The reaction temperature was increased to 250° C. and maintained for 40 minutes under nitrogen atmosphere. Thus the nitrogen gas flow was stopped and a vacuum of less than 0.4 mm Hg was applied. The reaction was continued at 270° C. under less than 0.4 mm Hg for 5 hours 5 minutes. The copolyester had an inherent viscosity of 0.65. The glass transition temperature was 78° C. A pressed film of about 10 mil thick broke when first folded. Thus, the amount of 1,4 bis(2-hydroxyethoxy)benzene was insufficient (5 mol percent of acid reactants).

EXAMPLE 4

Into a 1-liter stainless steel reactor equipped with a stirrer, nitrogen gas inlet port and a condenser, the following were added:
- 232.6 g. isophthalic acid
- 99.7 g. terephthalic acid
- 101.5 g. bis(4-β-hydroxyethoxy phenyl)sulfone
- 124.0 g. ethylene glycol
- 0.720 g. 1,1,1-tris(hydroxymethyl)ethane
- 0.1458 g. Sb$_2$O$_3$
- 0.131 g. titanylacetylacetonate
- 0.038 g. tetrasodium ethylenediaminetetraacetate The reaction mixture was heated at 192° C. for 50 minutes and at 240° C. for 27 minutes under nitrogen atmosphere. Water was continuously distilled out during this period. Then 0.688 g of tris(nonylphenyl)phosphite was added to the mixture in the reactor. The reaction temperature was increased to 250° C. and maintained for 20 minutes under nitrogen atmosphere. Thus the nitrogen gas flow was stopped and a vacuum of less than 0.4 mm Hg was applied. The reaction was continued at 270° C. under less than 0.4 mm Hg for 4 hours 23 minutes. The copolyester had an inherent viscosity of 0.69. The glass transition temperature was 78° C. A pressed film of about 10 mil thick broke when first folded.

EXAMPLE 5

Into a 1-liter stainless steel reactor equipped with a stirrer, nitrogen gas inlet port and a condenser, the following were added:
- 179.4 g. isophthalic acid
- 19.9 g. terephthalic acid
- 111.7 g. ethylene glycol
- 35.6 g. 1,3 bis(2-hydroxyethoxy)benzene
- 23.8 g. 1,4 bis(2-hydroxymethyl)ethane
- 0.4325 g. 1,1,1 tris(hydroxymethyl)ethane
- 0.0874 g. Sb$_2$O$_3$
- 0.0660 g. titanyl acetylacetonate
- 0.0303 g. manganese hypophosphite monohydrate The reaction mixture was heated at 240° C. for 1 hour 35 minutes under 30 psi nitrogen atmosphere and then the pressure was lowered to atmospheric. Water was continuously distilled out during this period. Then 0.4128 g. of tris(nonylphenyl)phosphite was added to the mixture in the reactor. The reaction temperature was increased to 250° C. and maintained for 15 minutes under nitrogen atmosphere. Thus the nitrogen gas flow was stopped and a vacuum of less than 0.4 mm Hg was applied. The reaction was continued at 270° C. under less than 0.4 mm Hg for 4 hours 35 minutes. The copolyester had an inherent viscosity of 0.82. The glass transition temperature was 62° C. A pressed film of about 10 mil thick required 3 cyclic foldings before losing its tear strength completely.

EXAMPLE 6

Into a 1-liter stainless steel reactor equipped with a stirrer, nitrogen gas inlet port and a condenser, the following were added:
- 179.4 g. isophthalic acid
- 19.9 g. terephthalic acid
- 97.4 g. ethylene glycol
- 35.6 g. 1,4 bis(2-hydroxyethoxy)benezene
- 0.4325 g. 1,1,1 tris(hydroxymethyl)ethane
- 0.0874 g. $Sb_2O_3$
- 0.0660 g. titanyl acetylacetonate
- 0.0303 g. manganese hypophosphite monohydrate
- 0.01140 g. tetrasodium ethylenediaminetetraacetate The reaction mixture was heated at 220° C. for 1 hour 35 minutes under nitrogen atmosphere. Was was continuously distilled out during this period. Then 0.4128 g. of this (nonylphenyl)phosphite was added to the mixture in the reactor. The reaction temperature was increased to 250° C. and maintained for 45 minutes under nitrogen atmosphere. Thus the nitrogen was flowas was stopped and a vacuum of less than 0.4 mm Hg was applied. The reaction was continued at 270° C. under less than 0.4 mm Hg for 4 hours. The copolyester had an inherent viscosity of 0.80. The glass transition temperature was 63° C. A pressed film of 10 mil required only one cyclic folding before losing its tear strength completely.

EXAMPLE 7

Into a 1-liter stainless steel reactor equipped in a stirrer, nitrogen gas inlet port and a condenser, the following were added:
- 233.4 g. dimethyl terephthalate
- 101.5 g. bis(4-β-hydroxyethoxyphenyl)sulfone
- 148.9 g. ethylene glycol
- 59.4 g. 1,4 bis(2-hydroxyethoxy)benzene
- 0.0874 g. $Sb_2O_3$
- 0.0660 g. titanyl acetylacetonate
- 0.0303 g. manganese hypophosphite monohydrate The reaction mixture was heated at 190° C. for 1 hour 35 minutes under nitrogen atmosphere. Methanol was continuously distilled out during this period. Then 0./4128 g. of tris(nonylphenyl)phosphite was added to the mixture in the reactor. The reaction temperature was increased to 240° C. and maintained for 40 minutes under nitrogen atmosphere. Thus the nitrogen gas flow was stopped and a vacuum of less than 0.4 mm Hg was applied. The reaction was continued at 270° C. under less than 0.4 mm HG for 4½ hours. The copolyester had an inherent viscosity of 0.66. The glass transition temperature was 94° C. A pressed film of about 10 mil thick required 20 cyclic foldings before losing its tar strength completely. A comparative sample made containing no 1,4 bis(2-hydroxyethoxy)benzene required only 8 cyclic foldings before losing its tear strength completely.

As noted, the solid copolyesters of the invention are contemplated as especially useful in packaging applications because of their combination of properties, such as in making hollow containers and film and sheet useful for packaging. Thus, another aspect of the invention contemplates such products made of such copolyesters. Such containers may be by blow molding or by injection molding, or by other known processes.

As will be evident to those skilled in the art, various modifications of this invention can be made or followed in the light of the foregoing disclosure and discussion without departing from the spirit and scope of the disclosure or from the scope of the claims.

We claim:

1. A solid thermoplastic copolyester consisting essentially of the reaction product of:
   (A) reactant(s) selected from isophthalic acid, terephthalic acid, and their $C_1$ to $C_4$ alkyl esters, and any mixture thereof in any proportion,
   (B) reactants, ethylene glycol plus 1,4 bis(2-hydroxyethoxy)benzene and one or both of 1,3 bis(2-hydroxyethoxy)benzene, bis(4-β-hydroxyethoxyphenyl)sulfone and, optionally, other dihydroxylated hydrocarbons or oxyhydrocarbons, wherein the B reactants are 110 to 300 mol percent of said A reactants,
   all B reactants combined, exclusive of ethylene glycol, do not exceed 90 mol percent of said A reactants,
   bis(4-β-hydroxyethoxyphenyl)sulfone is 0 to 80 mol percent of said A reactants,
   said other dihydroxylated oxyhydrocarbons or hydrocarbons are 0–20 mol percent of said A reactants,
   the mols of 1,3 bis(2-hydroxyethoxy)benzene plus twice the mols of bis(4-β-hydroxyethoxyphenyl)sulfone are at least 10 mol percent of said A reactants, and
   1,4 bis(2-hydroxyethoxy)benzene is 7–70 mol percent of said A reactants.

2. A solid copolyester of claim 1 wherein the amount of 1,4 bis(2-hydroxyethoxy)benzene is at least 10 mol percent of said A reactants.

3. Hollow containers having a composition of claim 1.

4. Sheet or film having a composition of claim 1.

* * * * *